Figure 1:
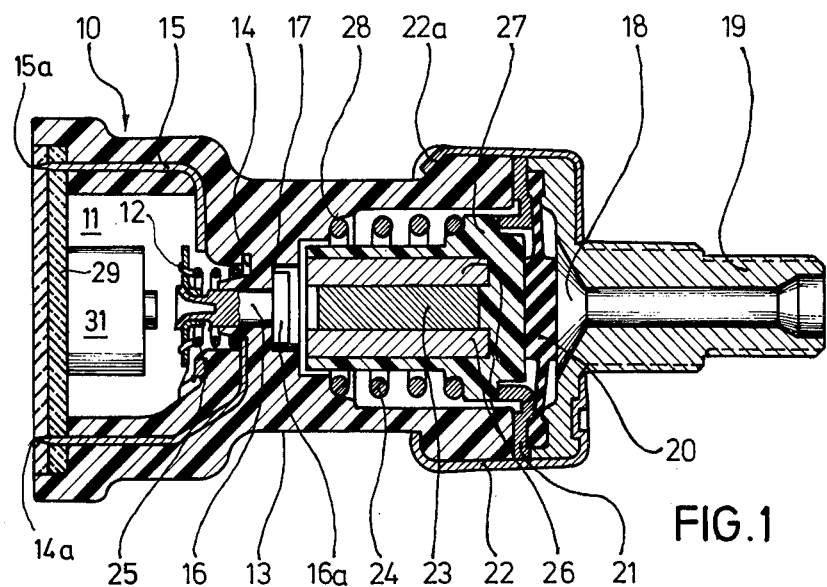

United States Patent [19]

Denamps et al.

[11] 4,082,960

[45] Apr. 4, 1978

[54] PNEUMATICALLY OPERATED PRESSURE SWITCH, PARTICULARLY FOR VEHICLE TIRE SUPERVISION

[75] Inventors: Jean Denamps, Ausnieres; Jean LeCossec, Esbly, both of France

[73] Assignee: Robert Bosch GmbH, Stuttgart, Germany

[21] Appl. No.: 730,634

[22] Filed: Oct. 7, 1976

[30] Foreign Application Priority Data

Nov. 3, 1975 Germany ............................ 2549010

[51] Int. Cl.² ............................................ H01H 35/34
[52] U.S. Cl. ................................ 307/118; 200/83 P; 200/83 L; 340/58
[58] Field of Search ............ 335/205; 200/83 R, 83 P, 200/83 L, 61.25, 81.9 M; 340/58, 242; 73/49; 307/10 R, 118

[56] References Cited

U.S. PATENT DOCUMENTS

| 2,628,296 | 2/1953 | Dillman | 200/83 L |
| 3,250,873 | 5/1966 | Kudlaty | 200/83 L |
| 3,963,887 | 6/1976 | Takusagawa | 200/83 L |

Primary Examiner—Gerald P. Tolin
Attorney, Agent, or Firm—Flynn & Frishauf

[57] ABSTRACT

To provide positive on-off switching when a pneumatic pressure threshold is passed, a movable switching element is magnetically attracted by a moving magnet, movable under force of a pressure diaphragm subjected to the pneumatic pressure. The movable switch element itself is biassed away from the magnet by a spring which is weaker than the restoring spring counteracting the pneumatic pressure. The non-linear displacement-force characteristics of the magnet cause snap action of the movable switch element, thus providing positive switching at accurately predeterminable pressure positions.

13 Claims, 2 Drawing Figures

U.S. Patent     April 4, 1978     4,082,960

PNEUMATICALLY OPERATED PRESSURE SWITCH, PARTICULARLY FOR VEHICLE TIRE SUPERVISION

Cross reference to related application: Maisch et al., U.S. Ser. No. 732,788, filed Oct. 15, 1976, now Pat No. 4,064,482, assigned to the assignee of the present application.

The present invention relates to a pressure operated switch, and more particularly to a pneumatically operated pressure switch especially adapted to supervise the pressure in the tires of automotive vehicles.

Tire pressure switches require precise and exacting switching operation when the pressure in the tire drops below a predetermined level; not only must the pressure drop be accurately reflected in switch operation, but switching itself must be positive when the pressure level is passed.

Switches have been proposed in which a contact element which is movable, for example in form of a contact bridge located in a switching chamber, cooperates with an axially movable switching element which is moved by an operating element, in turn moving under deflecting forces exerted against a membrane which separates the pressure fluid, typically compressed air in the tires of a vehicle, from the switching chamber.

Pressure switches have been used in connection with braking systems in which the pressure in fluid lines operates the pressure switch. The switching accuracy of such switches need not be high since the pressure differentials to effect switching operation, in relation to quiescent pressures, are wide. If pressurized braking systems are used, any defects in the pressure system cause a substantial drop in the operating pressure, so that a positively available switching force is given and the threshold level at which the switch operates can be set to be substantially different from operating pressure.

Supervising the pressure in tires of automotive vehicles places much more severe requirements on the accuracy of switching at a predetermined pressure level. It is important that, as tire pressure drops gradually, for example, the switching contacts do not gradually change switching state, but rather provide for precise and positive switching at a predetermined pressure, that is, for snap action switching at the predetermined pressure rather than gradual separation of contacts.

A pressure switch has been proposed in which a reed contact is located close to the tires, the reed contact being operated by a permanent magnet located on the wheel in dependence on tire pressure. This system has the disadvantage that the distance between the permanent magnet and the reed switch must be very small in order to provide for positive switching. The small distance is difficult to maintain in automotive vehicles due to changes in the bearing position of the wheel upon wear and tear, re-adjustment, and the like; additionally, shocks, bearing play, temperature changes and other ambient conditions which are beyond control of the operator or designer of the vehicle do not permit maintenance of the close tolerances required for positive switching operation. Thus, accurate supervision of tire pressure by reed switches placed on the frame of the vehicle and influenced by operating magnets on the wheel is difficult to obtain.

It is an object of the present invention to provide a pressure switch which permits exact switching operation at a predetermined pressure threshold level and which, further, initiates switching action independently of its relative location on the wheel with respect to the frame, that is, which is self-contained and yet small enough to be mounted on the wheel of a vehicle.

SUBJECT MATTER OF THE PRESENT INVENTION

Briefly, a switching chamber is provided in which a movable terminal, such as a switching or contact bridge, is located. A permanent magnet is operated to move in accordance with changes in tire pressure by being coupled to a membrane. A first spring opposes movement of the membrane, the spring acting on the permanent magnet. A second, and weaker spring biasses the movable contact element away from the permanent magnet. If the tire pressure is above the threshold level, the membrane will deflect the permanent magnet towards the switching element which contains an armature element, to be attracted thereby, and to move through a switching path. Upon drop of tire pressure, the stronger spring acting on the magnet will tend to pull the magnet away. As soon as the holding force of the magnet is overcome by the biassing spring acting on the contact bridge, separation will occur between the magnet and the movable switch element. The non-linear distance-force relationship of the magnet is made use of since, as soon as the magnet is separated from the movable element, the weaker spring will be able to pull the movable element away with accelerating speed as the attractive force of the magnet rapidly decreases upon increasing separation therefrom, thus ensuring snap action and positive switching.

Figure 2:
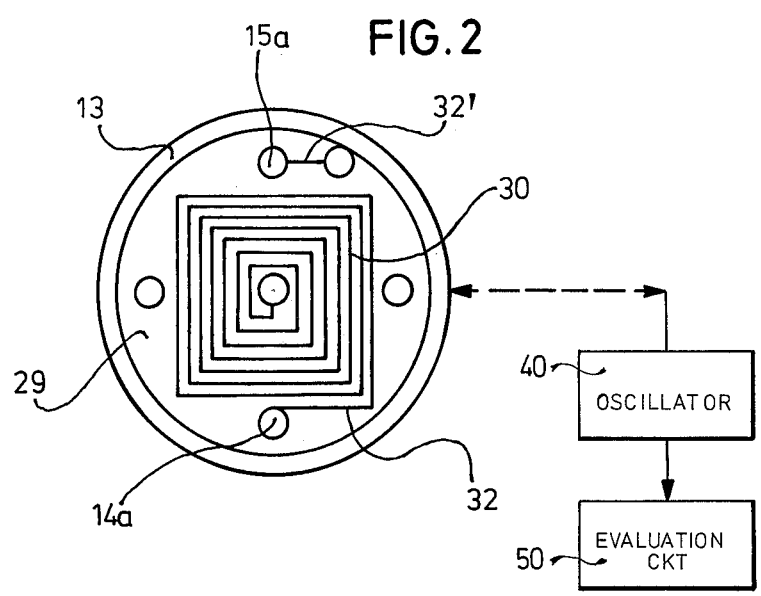

The invention will be described by way of example with reference to the accompanying drawings, wherein:

FIG. 1 is an axial cross-sectional view through the switch illustrating an embodiment to supervise automotive vehicle tire pressure; and FIG. 2 is a front end view of the switch plate, with the end cover removed or shown as a transparent cover.

FIG. 1 is drawn to a greatly enlarged scale; the element itself can be made very small. The switch 10 has a housing 13 formed of plastic or similar insulating material and is shaped to form a switching chamber 11. Two switching terminals 14, 15 extend into the switching chamber 11. A contact bridge 12 cooperates with switching contacts 14, 15 to establish connection therebetween or to break the connection between terminals 14, 15. Bridge 12 is secured to an axially slidable switching element 16 which is formed as a longitudinal bolt, slidable in a central bore in the housing 13. Bolt 16 is made of metal and is formed with a head 16a, engaged by a shoulder 17 in the axial bore of the switch housing. The bolt 16, or at least the head 16a thereof, is formed of a magnetically responsive material, so that the head 16a can provide an armature for a permanent magnet, as will be explained.

The pressure switch 10 is operated by pressure exerted in a pressure chamber 18 which is connected over a compressed air connection 19 directly or by means of a tube (not shown) with a source of compressed air, and in the particular application, the air in the tire of an automotive vehicle. Pressure chamber 18 is located at the facing end of the axial pressure switch opposite that of the switching chamber 11; the end of the pressure switch where the switching chamber 11 is located may be referred to as the front end of the pressure switch 10. Pressure chamber 18 is closed off by a membrane 20 to seal the pressure chamber 18 hermetically from the switching chamber 11. The pressure connection 19, membrane 20 and an abutment ring 21 are secured together by a tubular metal sleeve 22 which is rolled over a shoulder of the switch housing 13, as seen at 22a.

A permanent magnet 23 is located adjacent the side of the membrane 20 remote from the pressure chamber 18. Upon being subjected to compressed air, the permanent magnet 23 is slidable axially counter the force of a first spring 24. A second spring 25, weaker than the first spring 24, is located around bolt 16 to bias the bolt 16 away from the permanent magnet 23. Upon axial slidable movement of magnet 23, it will approach the head 16a of the bolt 16 to attract the bolt 16 counter the force of the second, weaker spring 25. The second, and weaker spring 25 is located between the contact bridge 12 and one of the switching contacts, spring 25 serving, simultaneously, as an electrical connection between the contact bridge 12 and the switching contact 14. Since the membrane 20, permanent magnet 23 and the bolt 16 are located in axially staggered arrangement along the longitudinal axis of the switch 10, sufficient air pressure in the pneumatic pressure chamber 18 will move the magnet 23 axially to the left (FIG. 1) so that the permanent magnet will attract the bolt 16. This pulls the contact bridge 12 towards the right, in the axial direction of the switch 10, towards the second switching contact 15, to provide an electrical connection between terminals 14 and 15 through contact bridge 12 and spring 24.

The holding force of the permanent magnet exerted on the cooperating armature or head 16a of the switching bolt 16 can be accurately determined by forming the permanent magnet 23 with two projecting pole shoes 26 projecting from the permanent magnet 23. Pole shoes 26 and permanent magnet 23 are all secured in a non-magnetic holding element 27. The first, and stronger spring 24 is located between a shoulder 28 in housing 13 and the holder element 27 and thus biasses the holder element 27 counter the force of pneumatic pressure in membrane 20 towards the right, that is, against membrane 20 and, in a limiting position, against the abutment ring 21 located in the housing 13 and held therein by the metal sleeve 22.

The switch in accordance with the present invention is particularly adapted to cooperate with a tuned tank circuit, to open and close the tank circuit, as tire pressure changes, and thereby provide output signals if the tank circuit is located in inductive relation to an oscillator 40 which is damped if the closed tank circuit passes an inductive transmitting coil of the oscillator. The entire system with which the switch in accordance with the present invention may operate is disclosed and claimed in the co-pending application assigned to the assignee of the present invention, Ser. No. 732,788, filed Oct 15, 1976, Maisch et al. The switch 13 can readily be constructed to form an integral tank circuit which is selectively opened or closed. The front end of the switch housing 13 is closed off from switching chamber 11 by a plate 29 of insulating material. Plate 29 has a spiral coil printed thereon, as best seen in FIG. 2. The spiral coil 30 is constructed as a printed circuit and connected over switching contacts 14 and 15 with a capacitor 31 located in the switching chamber 11 to form a tuned L/C circuit with an interposed switch. The switching terminal ends 14a, 15a of switching contacts 14, 15, respectively, and partially embedded in the housing 13 of the switch, extend through the insulating plate 29 and are there contacted with the conductive portion 23 forming the inductance coil 30. The spiral 30, formed as a conductive path as shown in FIG. 2 on the plate 29, is thus connected with one terminal to switching contact 14; the center terminal is connected to a capacitor 31, the other terminal of which is connected over a conductive bridge 32' with terminal end 15a of the switch terminal 15. The capacitor is preferably located at the side of the insulating plate 29 facing the switching chamber 11.

Operation: Let it be assumed that connection 19 is connected to the air nipple of an automotive tire. Switch 10 is secured to the wheel of the vehicle. Pressure switch 10, thus, rotates with the vehicle wheel. The switch will, therefore, upon each full rotation of the wheel, pass a fixed point on the frame of the vehicle. The vehicle is provided with oscillator 40 which generates a high-frequency magnetic field and has an inductive transducer located close to the vehicle wheel. The frequency of the oscillator is matched to the resonant frequency of the tank circuit formed by coil 30, capacitor 31 and the switch contacts 14, 12, 15.

If the switch contacts 14–12–15 are closed, the tank circuit is closed so that the externally acting magnetic field is highly damped as the tank circuit passes the field. No damping is effected if the switch is open. Thus, an unambiguous output signal is provided which can be further evaluated in evaluation circuit 50, as described and claimed in the aforementioned and cross-referenced application, to warn the operator of loss in tire pressure.

The magnetic circuit formed by the switching element 16 or, rather, its armature element 16a forming the head thereof, the pole shoes 26 and the permanent magnet 23, is so matched to the forces of the springs 24, 25 and the pressure in chamber 18 that, if the tire pressure is above a predetermined threshold level, the switching element 16 is attracted by the magnet 23 and thereby holds the tank circuit in closed condition. When the tire pressure drops below a predetermined value, the force of the bias spring 24 will no longer be counteracted by the air pressure in the pneumatic chamber 18 and acting on the membrane 25. The effective force of the stressed springs 24, 25 will become greater than the holding force of magnet 23. This causes separation of the armature head 16a of the switching bolt 16 from the pole shoes 26 of the magnet 23; the weaker, second spring 25 will move the switching bolt 16 against the housing abutment 17, thus lifting off the switching bridge 12 from contact 15. The tank circuit will be rapidly, reliably and unambiguously opened with snap action.

The magnetic system in pressure switch 10 avoids vibration of the contacts as the switching threshold pressure is approached. The permanent magnet 23 will be capable of attracting the switch head 16a of the operating element 16 only if a second, and larger value of air pressure is provided to compressed air chamber 18. Thus, the closing pressure is higher than the opening pressure. The resulting hysteresis between connecting pressure and disconnecting pressure of the switch can be preset by suitable selection of the spring constant of the second spring 25 and the relative strength of the magnet 23, utilizing the non-linear force-distance characteristic of the magnetic system. The disconnect pressure itself is determined by selection of the spring constant of the main, or first spring 24.

Various changes and modifications may be made within the scope of the inventive concept.

In one embodiment, the overall axial length of the switch, exclusive of the connection 19, was 47 mm; the cross-sectional diameter at the coil end was 30 mm; and the minimum diameter 21 mm. The main spring 24 was a small coil spring of steel having a spring constant of 0.29 N/cm; the second spring 25 was a coil spring of steel having a spring constant of 0.019 N/cm. The switching path, that is, the excursion of bolt 16 between closed and open circuit was 0.4 mm. The switch provided reliable disconnection of terminals 14, 15 at a pressure of 65 N/cm$^2$, and tolerated a maximum pressure of 100 N/cm$^2$. Variations of response of the switch to disconnect the circuit did not exceed more than 3 N/cm$^2$ from design value.

We claim:

1. Pressure operated switch to change state when the pressure of a pressure fluid drops below a predetermined level, having housing means (13) defining a switching chamber (11);

a fixed terminal (15) within the switching chamber (11);

a slidable, movable terminal (12) within the switching chamber (11);

a membrane (20) separating the pressure fluid from the switching chamber (11);

a permanent magnet (23) located to move upon deflection of the membrane when subjected to fluid pressure a pair of pole shoes (26) located adjacent the permanent magnet (23);

a non-magnetic holder (27) surrounding the permanent magnet (23) and the pole shoes to transfer movement thereof to transfer movement of the holder (27) in accordance with changes in pressure of the pressure fluid to the movable terminal (12) comprising a first spring (24) acting on said non-magnetic holder (27) and between a shoulder in the housing means (13) to press the permanent magnet (23) and its holder (27) against the membrane (20) and to bias the permanent magnet in a direction counter the deflection of the membrane (20) when subjected to fluid pressure;

and a second spring (25) weaker than said first spring engaging the movable terminal (12) the movable terminal having an armature (16a) located in magnetic attractive relation to said permanent magnet;

the membrance (20) and said springs (24, 25) being dimensioned to deflect under operating pressure which is greater than said predetermined pressure and in a direction counter the force of the first spring (24) to effect attraction of the armature and hence the movable terminal and ultimate engagement thereof and holding thereof by magnetic force overcoming thereby the force of the second spring (25), and, upon drop in pressure below said predetermined level, cause separating movement of the permanent magnet (23) under force of the first spring (24) permitting the second spring (25) to snap away the movable terminal (12) and effect positive snap action of the movable terminal.

2. Switch according to claim 1, wherein the fluid is compressed air and the pressure is pneumatic pressure; the switch is an axially elongated element, and the membrane (20), the permanent magnet (23) and the movable terminal (12) are located axially staggered one-behind-the-other along the longitudinal axis of the switch (10) and being axially slidable in the housing (13).

3. Switch according to claim 1, further comprising a stop abutment ring (21) located within the housing and forming and end stop engaged by the holder (27).

4. Switch according to claim 2, wherein the movable terminal (12) forms a terminal bridge, and the second spring (25) forms an electrical contact between a fixed terminal (14) located within the housing and the terminal bridge (12).

5. Switch according to claim 1,
and wherein the movable terminal (12) forms a terminal bridge, and the second spring (25) forms an electrical contact between a fixed terminal (14) located within the housing and the bridge (12).

6. Non-contacting pressure sensitive switching element comprising the switch of claim 1 wherein the switch is an axially elongated element, the switching chamber (11) having an end face, an insulating plate (29) closing off the switching chamber and forming the end face thereof, a spiral coil (30) located on the insulating plate (39) and a capacitor (31) located within the switching chamber and connected to the coil (30) and through the switching contacts (14, 15) to form a selectively openable and closable tuned tank circuit.

7. Switching element according to claim 6, wherein two fixed switching output terminals (14a, 15a) are secured to the housing (13) of the switch and have free ends extending through the insulating plate (29), and electrical connecting paths (32, 32') located on the insulating plate (29) and in electrical connection with the terminals of the switch.

8. Switching element according to claim 6, wherein the coil (30) forms a printed circuit located on the insulating plate (29), and a printed circuit (32') path located on the insulating plate (29) and connecting the capacitor (31) into the tuned tank circuit.

9. Non-contacting tire pressure sensing switch element comprising the switch of claim 2 wherein the switch is an axially elongated element, the switching chamber (11) having an end face, an insulating plate (29) closing off the switching chamber and forming the end face thereof, a spiral coil (30) located on the insulating plate (39) and a capacitor (31) located within the switching chamber and connected to the coil (30) and through the switching contacts (14, 15) to form a selectively openable and closable tuned tank circuit;

and wherein the movable terminal (12) forms a terminal bridge, and the second spring (25) forms an electrical contact between a fixed terminal (14) located within the housing and the bridge (12).

10. Non-contacting, remote-control fluid pressure supervisory system comprising the switch element of claim 6;

means (40) transducing high-frequency radiation of a frequency to which the tank circuit is tuned, and means (50) sensing reaction of the tuned circuit on the transducing means to thereby determine if the switch terminals (14, 12, 15) are open or closed and thereby determine if the fluid pressure is above or below the predetermined level.

11. Tire pressure sensing system comprising the switch of claim 1 wherein the fluid is air, and the predetermined pressure is tire pressure level below a safe pressure.

12. System according to claim 10 to sense air pressure in automotive tires, wherein the fluid is air, and the predetermined pressure is tire pressure level below a safe pressure.

13. Non-contacting, remote-control automotive tire pressure supervisory system comprising the switch element of claim 9, further comprising means (40) transducing high-frequency radiation of a frequency to which the tank circuit is tuned, and means (50) sensing reaction of the tuned circuit on the transducing means to thereby determine if the switch terminals are open or closed and thus determine if tire pressure is above or below the predetermined level.

* * * * *